United States Patent
Palanki et al.

(10) Patent No.: US 12,530,174 B2
(45) Date of Patent: Jan. 20, 2026

(54) LARGE LANGUAGE MODEL (LLM) RISK MITIGATION

(71) Applicant: American Express Travel Related Services Company, Inc., New York, NY (US)

(72) Inventors: Hiranmayi Palanki, Tampa, FL (US); Shankar Djeyassilane, Markham (CA)

(73) Assignee: American Express Travel Related Services Company, Inc., New York, NY (US)

( * ) Notice: Subject to any disclaimer, the term of this patent is extended or adjusted under 35 U.S.C. 154(b) by 193 days.

(21) Appl. No.: 18/479,854

(22) Filed: Oct. 3, 2023

(65) Prior Publication Data

US 2025/0110711 A1   Apr. 3, 2025

(51) Int. Cl.
| | |
|---|---|
| *G06F 40/226* | (2020.01) |
| *G06F 8/35* | (2018.01) |
| *G06F 8/60* | (2018.01) |
| *G06F 9/445* | (2018.01) |
| *G06F 9/455* | (2018.01) |
| *G06F 16/35* | (2025.01) |
| *G06F 16/383* | (2019.01) |

(52) U.S. Cl.
CPC . *G06F 8/35* (2013.01); *G06F 8/60* (2013.01)

(58) Field of Classification Search
CPC . G06F 8/35; G06F 8/60; G06F 40/226; G06F 11/3684; G06F 11/3692; G06F 40/30; G06F 16/35; G06F 16/383; G06V 30/41; G06N 20/00; G06N 3/091
See application file for complete search history.

(56) References Cited

U.S. PATENT DOCUMENTS

| | | | |
|---|---|---|---|
| 12,292,915 B1 * | 5/2025 | Majmudar | G06F 40/40 |
| 12,332,772 B1 * | 6/2025 | Arunagiri | G06F 40/226 |

* cited by examiner

*Primary Examiner* — Thuy Dao
(74) *Attorney, Agent, or Firm* — Thomas Horstemeyer, LLP

(57) ABSTRACT

Disclosed are various approaches for large language model (LLM) application risk mitigation. A large language model (LLM) application that interacts with a network LLM service can be identified. A portion of the LLM application can be provided as input to an LLM risk mitigation code generation function that outputs LLM-specific risk mitigation code. A runtime environment can be deployed to include a modified version of the LLM application that includes the LLM-specific risk mitigation code, a kernel-layer LLM risk mitigation program that can intercept LLM interaction system calls to apply the LLM-specific risk mitigation code, or any combination thereof.

20 Claims, 5 Drawing Sheets

LARGE LANGUAGE MODEL (LLM) RISK MITIGATION

BACKGROUND

Large language models (LLMs) are expanding the use of artificial intelligence (AI) exponentially. As this expansion continues, companies developing LLMs will contend with the challenges of ensuring the security of large amounts of data. The security of the data used to train the LLM itself is important, as are the responses that it creates for users. One of the significant concerns is the potential for misuse of LLMs and the reliance upon erroneous output generated LLMs.

For example, these models can generate highly realistic and coherent text, which may or may not be accurate. As a result, LLMs are tools with the ability to provide great utility as well as great harm. Their potential for misuse is concerning, enabling the creation of deceptive and inaccurate content. Biases can perpetuate unfair commentary that can contribute to societal problems. LLMs can also raise privacy concerns as they could inadvertently generate text containing sensitive personal and enterprise information.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for large language model (LLM) risk reduction. LLMs are expanding in use. As this expansion continues, enterprises developing LLMs and applications that interact with LLMs will contend with the challenges of ensuring the security of large amounts of data. The security of the data used to train the LLM itself is important, as are the responses that it creates for users. One of the significant concerns is the potential for misuse of LLMs and the reliance upon erroneous output generated LLMs. These models can generate highly realistic and coherent text, which may or may not be accurate. As a result, LLMs are tools with the ability to provide great utility as well as great harm. Their potential for misuse is concerning, enabling the creation of deceptive and inaccurate content. Biases can perpetuate unfair commentary that can contribute to societal problems. LLMs can also raise privacy concerns as they could inadvertently generate text containing sensitive personal and enterprise information.

The mechanisms described in the present disclosure can identify "LLM applications" that interact with LLMs and other generative artificial intelligence solutions, use a private LLM to generate risk mitigation code, and can apply pre-sink method risk mitigation techniques based at least in part on the risk mitigation code. The risk mitigation code can be utilized to modify the LLM application itself. Additionally or alternatively, the risk mitigation code can be used in a kernel level risk mitigation process. The kernel level risk mitigation process can intercept system calls to and from network LLM services, modify intercepted packets, and forward the modified packets.

In the following discussion, a general description of the components of risk mitigation systems and methods are provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
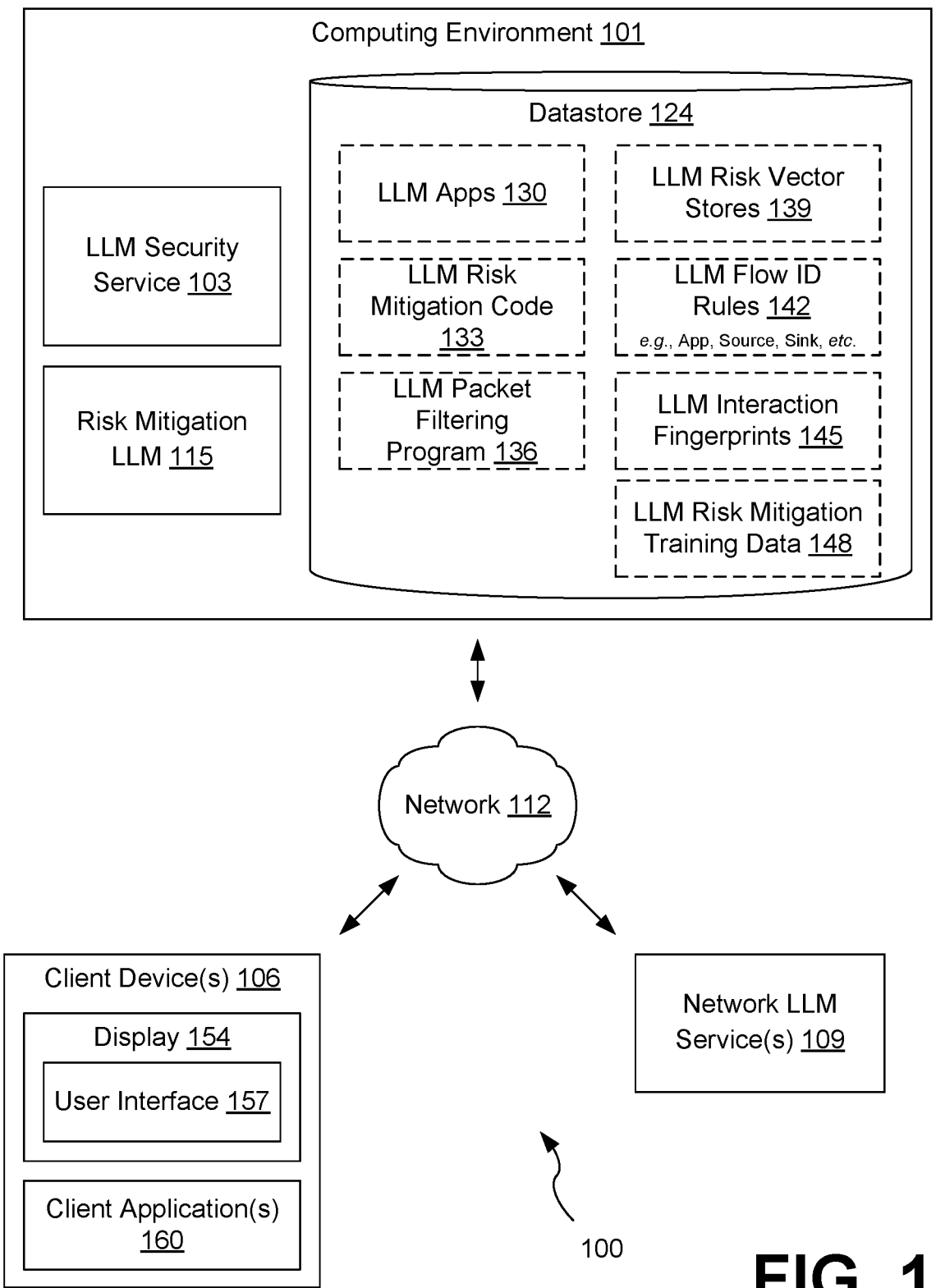
FIG. 1 is a drawing of a networked environment that includes components for large language model (LLM) risk mitigation according to various embodiments of the present disclosure.

With reference to FIG. 1, shown is a networked environment 100 according to various embodiments. The networked environment 100 can include a computing environment 101 for an LLM security service 103, a client device 106, and network LLM services 109, which can be in data communication with each other via a network 112. Although depicted and described separately, the network LLM services 109 can operate as a component executed using the computing environment 101 in various embodiments of the present disclosure. The risk mitigation code LLM 115 can be considered a component integrated with or separate from the LLM security service 103.

The network 112 can include wide area networks (WANs), local area networks (LANs), personal area networks (PANs), or any combination thereof. These networks can include wired or wireless components or any combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 101 can include one or more computing devices that include a processor, a memory, and/or a network interface. For example, the computing devices can be configured to perform computations on behalf of other computing devices or applications. As another example, such computing devices can host and/or provide content to other computing devices in response to requests for content. The computing environment 101 can provide an execution environment for the LLM security service 103, the risk mitigation LLM 115, and other executable instructions.

Moreover, the computing environment 101 can employ a plurality of computing devices that can be arranged in one or more server banks or computer banks or other arrangements. Such computing devices can be located in a single installation or can be distributed among many different geographical locations. For example, the computing environment 101 can include a plurality of computing devices that together can include a hosted computing resource, a grid computing resource or any other distributed computing arrangement. In some cases, the computing environment 101 can correspond to an elastic computing resource where the allotted capacity of processing, network, storage, or other computing-related resources can vary over time. Various applications or other functionality can be executed in the computing environment 101. The components executed on the computing environment 101 include a LLM security service 103, the risk mitigation LLM 115, and other applications, services, processes, systems, engines, and functionality not discussed in detail herein.

Various data is stored in a datastore 124 that is accessible to the computing environment 101. The datastore 124 can be representative of a plurality of datastores 124, which can include relational databases or non-relational databases such as object-oriented databases, hierarchical databases, hash tables or similar key-value datastores, as well as other data storage applications or data structures. Moreover, combinations of these databases, data storage applications, and/or data structures can be used together to provide a single, logical, datastore. The data stored in the datastore 124 is associated with the operation of the various applications or functional entities described below.

The data is stored in a datastore 124 can include LLM applications 130, LLM risk mitigation code 133, an LLM packet filtering program 136, LLM risk vector stores 139, LLM flow identification rules 142, and LLM interaction fingerprints 145. The LLM application 130 can refer to an image of an application that interacts with one or more LLM service 109. The LLM application 130 can be referred to as an LLM interaction application.

The risk mitigation code LLM 115 can be a generative artificial intelligence process of the LLM security service 103. The risk mitigation code LLM 115 can be trained to automatically generate LLM risk mitigation code 133 to add to and modify LLM applications 130. The risk mitigation code LLM 115 can be trained based at least in part on the LLM risk mitigation training data 148. The LLM risk mitigation training data 148 can include a predetermined set of LLM interaction code that are confirmed insecure as well as a set of LLM interaction code that are confirmed to be secure. The LLM risk mitigation training data 148 can include a set of secure and insecure code for each of the types of LLM risk mitigation code 133 that the risk mitigation LLM 115 is designed to generate.

The LLM risk mitigation code 133 can include code that tests and mitigates various risks associated with interactions with network LLM services 109 as discussed. The LLM risk mitigation code 133 can in some cases include or remotely access LLM risk vector stores 139 to identify whether communication packets generated or received by an LLM application 130 are associated with specified risks. To this end, the LLM risk mitigation code 133 can include harmful content mitigation code, bias mitigation code, SDE leakage prevention code, LLM hallucination mitigation code, LLM threat model code, prompt injection security code, and others. The code can perform testing and modification actions described further below. The various types of LLM risk mitigation code 133 can modify message content and other information in packets communicated between the LLM application 130 and the LLM service 109. The LLM risk mitigation code 133 can include modifications to code of the LLM applications 130 so that the LLM application 130 can generate acceptably risk free message content and modify received message content from network LLM services 109.

The harmful content filtering code can include an automated evaluation that involves the identification and removal of offensive, inappropriate, or dangerous material. Harmful content an include explicit content, hate speech, cyberbullying, misinformation, scams, and so on. Harmful content filtering code can ensure that an LLM application 130 does not transmit harmful content to an LLM service 109. Harmful content filtering code can include testing the response from the LLM service 109 for harmful content. The bias mitigation code can include code that checks communications for cosine or other similarity with a set of known harmful content, for example, stored as LLM risk vector stores 139.

The bias mitigation code can include an automated evaluation that identifies and addresses biases in an LLM application 130, including its communications with network LLM services 109. Bias mitigation code can measure bias in application outputs that are transmitted as LLM inputs for network LLM services 109. Bias mitigation code can include testing the response from the LLM service 109 for biases. The bias mitigation code can include code that checks communications for cosine similarity or other similarity with a set of known or predetermined biases, for example, stored as LLM risk vector stores 139.

The SDE leakage code can include an automated evaluation that ensures sensitive data elements that are not output from an LLM application 130 as input to an LLM service 109. An SDE leakage test can involve checking the LLM inputs from the LLM application 130 for a predetermined set of enterprise-specified SDEs, which can refer to proprietary or otherwise sensitive enterprise or personal information in terms, phrases, names, and so on. The bias mitigation code can include code that checks communications for cosine or other similarity with a set of known or predetermined SDEs, for example, stored as LLM risk vector stores 139.

An LLM hallucination code can include an automated evaluation that ensures the LLM inputs generated by an LLM application 130 do not cause an LLM service 109 to "hallucinate" or respond with false information, to a predetermined threshold. LLMs can sometimes generate responses that seem plausible but are actually inaccurate, fictional, or unsupported by facts. These inaccurate LLM responses can be referred to as "hallucinations." An LLM hallucination test can check whether the LLM inputs generated by an LLM application 130 are factually accurate according to a predetermined and stored factual knowledge base. The LLM hallucination test can check whether the responses received from the LLM service 109 are factually accurate according to a predetermined and stored knowledge base. In some examples, the knowledge base can include one or more for LLM risk vector stores 139 that store factually accurate data for a number of topics.

The LLM threat model code can include an automated evaluation that analyzes the LLM application 130 and its communications with a network LLM service 109 from the perspective of an attacker. This can identify and quantify security risks associated with LLM inputs generated by the LLM application 130 and responses from the LLM service 109. In some examples, generation of LLM threat model code can include a threat model test that decomposes the LLM application 130, determines and ranks an identified set of threats, and determining countermeasures and mitigations.

The prompt injection prevention code can include an automated evaluation that analyzes the LLM application 130 and its communications with a network LLM service 109 to identify whether malicious prompt injections appear to be introduced by attackers in an attack on the LLM application 130. This can include comparison of communications to a prompt injection prevention data set stored as a LLM risk vector store 139.

While referred to as a packet filtering program, the LLM packet filtering program 136 can include any kind of mitigation program that intercepts LLM interactions and performs risk mitigation. In various examples, the LLM packet filtering program 136 can include or use an Extended Berkeley Packet Filter (eBPF), another kernel-level packet or content filter, an application-level filter, a stateful firewall, or any combination thereof. In some examples, the LLM packet filtering program 136 operates at the kernel layer, for example, in a Linux® operating system kernel or another kernel. A kernel layer can refer to a system layer or another privileged layer in relation to a privilege hierarchy of a computing device or operating system. The LLM packet filtering program 136 can alternatively operate at an application layer. An application layer can refer to a user layer, user space, or an unprivileged layer in relation to a privilege hierarchy of a computing device or operating system.

The LLM packet filtering program 136 can identify and intercept communications from the LLM applications 130 and destined for network LLM services 109. The LLM packet filtering program 136 can identify and intercept communications received from network LLM services 109 for the LLM applications 130. The LLM packet filtering program 136 can intercept packets, modify the packets, and forward the packets to the original destination. In some examples, the LLM packet filtering program 136 can include integrated LLM risk mitigation code 133 to test and modify intercepted packets. The LLM packet filtering program 136 can additionally or alternatively pass the intercepted packets to separately-executed LLM risk mitigation code 133 to modify intercepted packets.

The LLM packet filtering program 136 can include or be associated with trigger code that identifies events or conditions specified by a hook event that triggers further execution of the LLM packet filtering program 136. The LLM packet filtering program 136 can be attached to a network communications interface. The network communications interface can transmit packets using protocols including Transmission Control Protocol (TCP), User Datagram Protocol (UDP) Internet Protocol (IP), among other protocols. The network communications interface can provide an endpoint for sending and receiving data from a device that provides a runtime environment for an LLM application 130. In one example, network communications interface can provide a socket interface.

The trigger code of the LLM packet filtering program 136 can cause a risk mitigation portion of the LLM packet filtering program 136 to execute when a packet is received and identified to conform to one or more predetermined LLM interaction fingerprints 145. Only packets that conform to LLM interaction fingerprints 145 trigger execution of the LLM packet filtering program 136, while other packets on the same communications interface are passed unmodified and without triggering the LLM packet filtering program 136. The LLM packet filtering program 136 is highly efficient and can run with minimal overhead within the kernel, providing computational and energy benefits relative to other kinds of LLM risk mitigation programs.

The LLM packet filtering program 136 can perform risk mitigation actions using various operations including at least one of packet filtering, network address translation, monitoring, tracing, or any combination thereof. The LLM packet filtering program 136 can read and modify data in kernel memory. The LLM packet filtering program 136 can intercept, modify, and forward communications to perform risk mitigation. In some examples, the LLM packet filtering program 136 can use or integrate one or more types of LLM risk mitigation code 133. The LLM packet filtering program 136 can also perform a tracing functionality that includes logging information, as well as providing the original and modified packets along with timestamped metadata for analysis or write to a log file. In some examples, the LLM packet filtering program 136 provides this tracing data to an associated tracer program in user space. In any case, the tracing data can be provided to the LLM security service 103 or another LLM communication data storage and analysis service.

Some examples of the LLM packet filtering program 136 can perform risk mitigation actions using LLM risk mitigation code 133 that includes an inline LLM that takes the packet as input and outputs a modified packet and/or instructions to drop the packet, store it, perform a forwarding action to perform risk mitigation. The modified packet can include a modified message, parameter set, and other modified LLM input content. The modified packet can also include a modified destination address.

The LLM security service 103 can include a service that includes programs and instructions that analyzes LLM applications 130 and facilitates risk mitigation in their communications with network LLM services 109. To this end, the LLM security service 103 can analyze source code and bytecode of various applications to identify whether the applications interact with network LLM services 109. This static analysis can be performed according to a portion of the LLM flow identification rules 142.

The LLM security service 103 can thereby identify an LLM flow that is a subset of an overall flow of the LLM application 130. The LLM security service 103 can include or use a plugin for a static code analysis program to identify that an application is an LLM application 130, and to identify the LLM flow portion of the LLM application 130. The LLM flow can include an LLM source method and an LLM sink method, as well as other intermediate methods or actions.

The LLM source method can refer to a method of the LLM application 130 generates or provides data ultimately used to generate an LLM input and transmit it to a network LLM service 109. This can include methods that receive or access user inputs, files, network requests, and other data. By contrast with a standard source method, the LLM source method is specifically designed to provide source information for network LLM services 109. The LLM sink method can refer to a component or function that consumes or processes data received from the network LLM service 109. By contrast with a standard sink method, the LLM sink method can refer to a sink method that is specifically designed to process information from network LLM services 109.

The LLM flow identification rules 142 can include rules that enable the LLM security service 103 or a static analysis program plugin to identify LLM applications 130. The LLM flow identification rules 142 can also include rules that enable the LLM security service 103 or a static analysis program plugin to identify LLM flows in the LLM applications 130, including LLM source methods and LLM sink methods. One LLM application 130 can include multiple LLM flows.

The LLM interaction fingerprints 145 can include a set of data that the LLM security service 103 generates for the LLM packet filtering program 136 to identify LLM interaction communications as a subset of system calls and communications sent and received by the LLM application 130. The LLM interaction communications are between endpoints associated with the LLM application 130 and the network LLM service 109. The LLM application 130 can also include network communication with other services, client device 106, and endpoints.

The LLM interaction fingerprints 145 can include an identification of an interface or type of interface that the LLM application 130 uses for LLM interaction communications, and instructions to identify a set of one or more memory addresses such as kernel memory addresses that emanate to the network LLM service 109 and receive data from the network LLM service 109. Alternatively, the memory addresses can be provided directly. The LLM interaction fingerprints 145 can also include network addresses of a network endpoint associated with the network LLM service 109, such as an API exposed by the network LLM service 109. The LLM interaction fingerprints 145 can also include a format of a communication or packet that is formatted to invoke an API exposed by the network LLM service 109 or otherwise communicate with the network LLM service 109.

The LLM packet filtering program 136 trigger code can inspect communications through the interface or type of interface in the LLM interaction fingerprints 145. The LLM packet filtering program 136 trigger code can trigger the LLM packet filtering program 136 if the communications correspond to one or more aspects of the LLM interaction fingerprints 145.

The client device 106 is representative of a plurality of client devices 106 that can be coupled to the network 112. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 154, such as liquid crystal displays (LCDs), gas plasma-based flat panel displays, organic light emitting diode (OLED) displays, electrophoretic ink ("E-ink") displays, projectors, or other types of display devices. In some instances, the displays 154 can be a component of the client device 106 or can be connected to the client device 106 through a wired or wireless connection.

The client device 106 can be configured to execute various applications such as a client application 160 or other applications. The client application 160 can be executed in a client device 106 to access network content served up by the computing environment 101 or other servers, thereby rendering a user interface 157 on the displays 154. To this end, the client application 160 can include a browser, a dedicated application, or other executable, and the user interface 157 can include a network page, an application screen, or other user mechanism for obtaining user input. The client device 106 can be configured to execute client applications 160 such as browser applications, chat applications, messaging applications, email applications, social networking applications, word processors, spreadsheets, or other applications.

The network LLM service 109 can refer to an online platform or service that provides access to LLMs like OPENAI®'s GPT-3 (Generative Pre-trained Transformer version 3) LLM or other versions of the GPT LLM, the Large Language Model Meta AI (LLaMA), Pathways Language Model (PaLM), or other generative artificial intelligence models. The LLM service 109 can include a chatbot service or another type of service that allows developers, researchers, and businesses to develop LLM applications 130 that integrate the textual language generation capabilities of LLMs. network LLM services 109 can include pre-trained models that have been trained on a large amount of text data. The LLMs learn and identify patterns in grammar and semantics in order to generate coherent and contextually relevant text. Network LLM services 109 can use natural language processing to perform tasks such as text generation, summarization, translation, sentiment analysis, question answering, text completion and other language based processes. Network LLM services 109 can expose one or more APIs that enable LLM applications 130 to send text inputs and receive generated outputs from an LLM.

The following sequence diagrams and flowcharts provide a general description of the operation of the various components of the networked environment 100. Although the general descriptions can provide provides an example of the interactions between the various components of the networked environment 100, other interactions between the various components of the networked environment 100 are also possible according to various embodiments of the present disclosure. Interactions described with respect to a particular figure or sequence diagram can also be performed in relation to the other figures and sequence diagrams herein.

Figure 2:
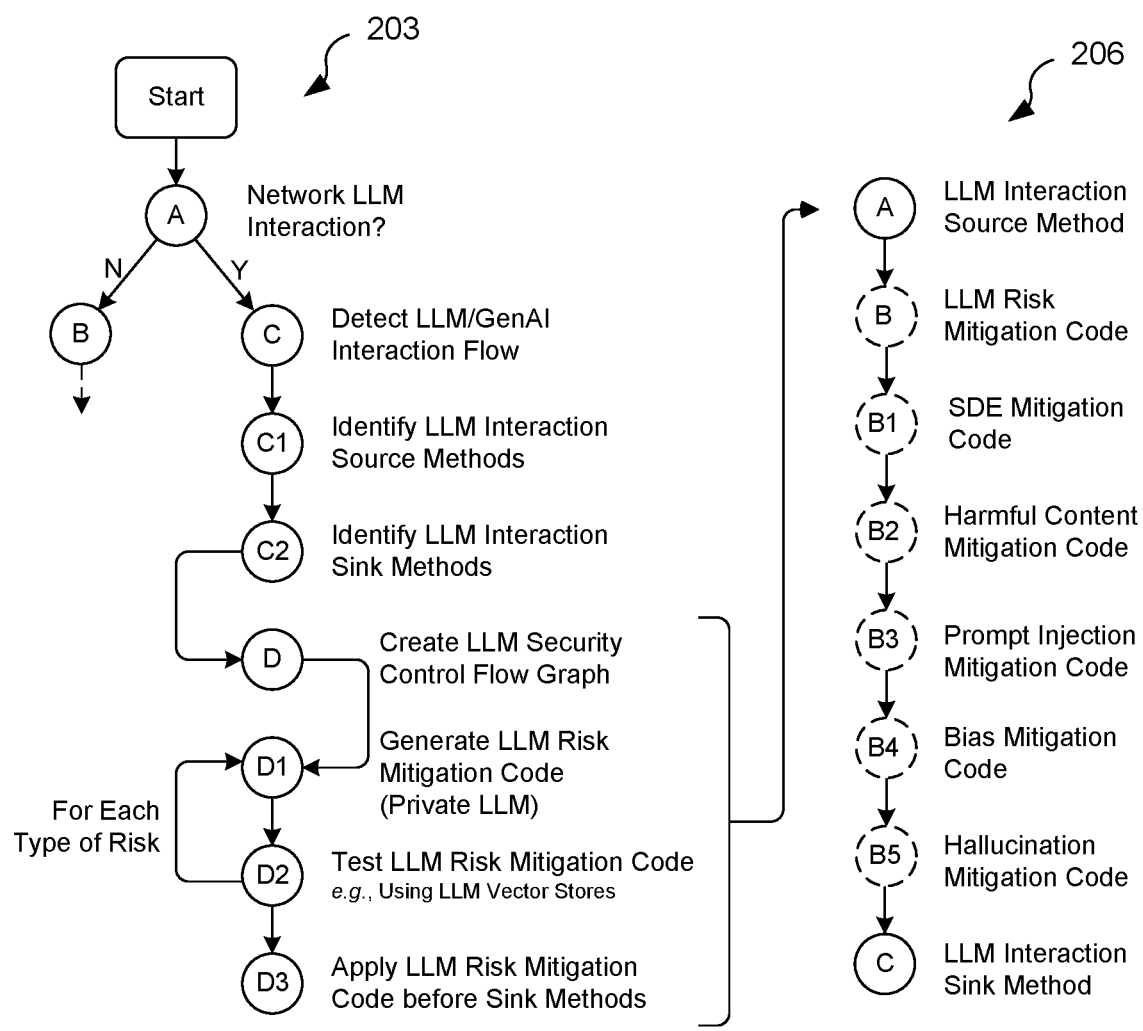
FIG. 2 illustrates an example of implementing LLM risk mitigation using the components of the networked environment of FIG. 1 according to various embodiments of the present disclosure.

FIG. 2 illustrates an example of the components of the networked environment 100 of FIG. 1 implementing LLM risk mitigation. Generally, this figure shows an example risk mitigation flow graph 203 of the LLM security service 103. The figure also shows an LLM security control flow graph 206 generated and augmented by the LLM security service 103 based at least in part on an LLM interaction portion of the LLM application 130. Generally, the risk mitigation flow graph 203 shows how the LLM security service 103 analyzes an application to determine whether it is an LLM application 130, and performs an LLM-interaction-specific risk mitigation process once an LLM application 130 is identified.

At node A, the LLM security service 103 can determine whether an application is an LLM application 130. The LLM security service 103 can use the LLM flow identification rules 142 to identify code in the application that includes any LLM interactions by checking for matches or similarity based at least in part on a calculation of cosine similarity, Euclidean distance, Jaccard similarity, or another type of comparison according to predetermined rules. The LLM flow identification rules 142 can reference an LLM vector store 139 that provides examples of LLM interactions or otherwise identifies LLM interactions. The LLM security service 103 can process the application using the LLM vector store 139 according to the LLM flow identification rules 142 to identify whether the application includes any LLM interactions. If there are no LLM interactions, then the process can proceed to a non-LLM-interaction portion at node B. Otherwise the process can move to node C.

At node C, the LLM security service 103 can identify an LLM interaction or generative artificial intelligence flow portion of the LLM application 130. The LLM application 130 can include a number of LLM interaction portions. This can include identification of LLM source methods and LLM sink methods.

At node C1, the LLM security service 103 can use the LLM flow identification rules 142 to identify code in the application that includes any LLM source methods by checking for matches or similarity according to predetermined rules. The LLM flow identification rules 142 can reference an LLM vector store 139 that provides examples of LLM source methods or otherwise identifies LLM source methods. The LLM security service 103 can process the LLM application 130 using the source methods LLM vector store 139 according to the LLM flow identification rules 142 to identify the LLM source methods.

At node C2, the LLM security service 103 can use the LLM flow identification rules 142 to identify code in the application that includes any LLM sink methods by checking for matches or similarity according to predetermined rules. The LLM flow identification rules 142 can reference an LLM vector store 139 that provides examples of LLM sink methods or otherwise identifies LLM sink methods. The LLM security service 103 can process the LLM application 130 using the sink methods LLM vector store 139 according to the LLM flow identification rules 142 to identify the LLM sink methods.

The LLM security service 103 can also identify one or more nodes or functions of the LLM interaction flow that are between the LLM source method and the LLM sink method. This can include LLM-specific and LLM-agnostic data validation, sanitization, transformation, storage, processing, analysis, authorization, authentication, data transfer (e.g., to the LLM), and other types of nodes. LLM-specific nodes can include nodes for sensitive data elements, harmful content, prompt injection security, bias mitigation, hallucination mitigation, and other types of data validation and sanitation. This can also include checks for valid addressing of transmissions and other types of LLM-agnostic nodes of the LLM interaction flow.

At node D, the LLM security service 103 can create the LLM security control flow graph 206 based at least in part on the original LLM interaction flow and additional (or modified) nodes corresponding to LLM-specific functions. In the nonlimiting example shown, nodes A and C of the LLM security control flow graph 206 can be original LLM interaction flow nodes corresponding the LLM interaction source method and LLM interaction sink method. Node B, including sub-functions B1-B5 of the LLM security control flow graph 206 correspond to LLM-specific functions. In various examples, additional LLM-specific functions can be added, or some of these LLM-specific functions can be pre-existing, but can be tested and modified through the risk mitigation flow of the LLM security service 103. In this example, creation of the LLM security control flow graph 206 can include portions D1 through D3.

At node D1, the LLM security service 103 can use the risk mitigation LLM 115 to generate LLM risk mitigation code 133 based at least in part on the original LLM interaction flow. The LLM risk mitigation code 133 can include code that tests and mitigates various risks associated with interactions with network LLM services 109 as discussed. The LLM risk mitigation code 133 can include or remotely access LLM risk vector stores 139 to identify whether communication packets generated or received by an LLM application 130 are associated with specified risks. To this end, the LLM risk mitigation code 133 can include harmful content mitigation code, bias mitigation code, SDE leakage prevention code, LLM hallucination mitigation code, LLM threat model code, prompt injection security code, and others.

The various types of LLM risk mitigation code 133 can modify message content and other data from the LLM interaction flow such as information from the LLM source method, as well as information received from the LLM service 109. This can include information in packets communicated between the LLM application 130 and the LLM service 109. The LLM risk mitigation code 133 can include modifications to code of the LLM applications 130 so that the LLM application 130 can generate acceptably risk free message content and modify received message content from network LLM services 109. In some examples, the LLM source method and the LLM sink method can also be updated or modified based at least in part on LLM risk mitigation code 133.

At node D2, the LLM security service 103 or the risk mitigation LLM 115 can test the LLM risk mitigation code 133 it generates. This can include checking the LLM-generated code against a set of one or more LLM risk vector stores 139. The LLM risk vector stores 139 can include vector stores for each of the types of LLM risks corresponding to types of LLM risk mitigation code 133 that the risk mitigation LLM 115 generates. If this vector store test fails, then the LLM security service 103 or the risk mitigation LLM 115 can recursively provide the LLM risk mitigation code 133 and/or the resulting overall set of code corresponding to the LLM security control flow graph 206 back to the risk mitigation LLM 115. This process can continue recursively until the LLM risk mitigation code 133 and/or the resulting overall set of code is free from risks according to the test against the LLM risk vector stores 139.

At node D3, the LLM security service 103 can apply the LLM risk mitigation code 133 to the LLM security control flow graph 206. The LLM security service 103 can also update the LLM application 130 by replacing the code of the original LLM interaction flow with the LLM security control flow graph 206. While the static code analysis and other aspects of FIG. 2 are discussed mostly with relation to a security modifications to code of an LLM application 130, the LLM security service 103 and the risk mitigation LLM 115 can also generate LLM interaction fingerprints 145 that enable a kernel layer program to intercept, modify, and otherwise affect packets. This process is discussed in further detail with respect to FIG. 3.

Figure 3:
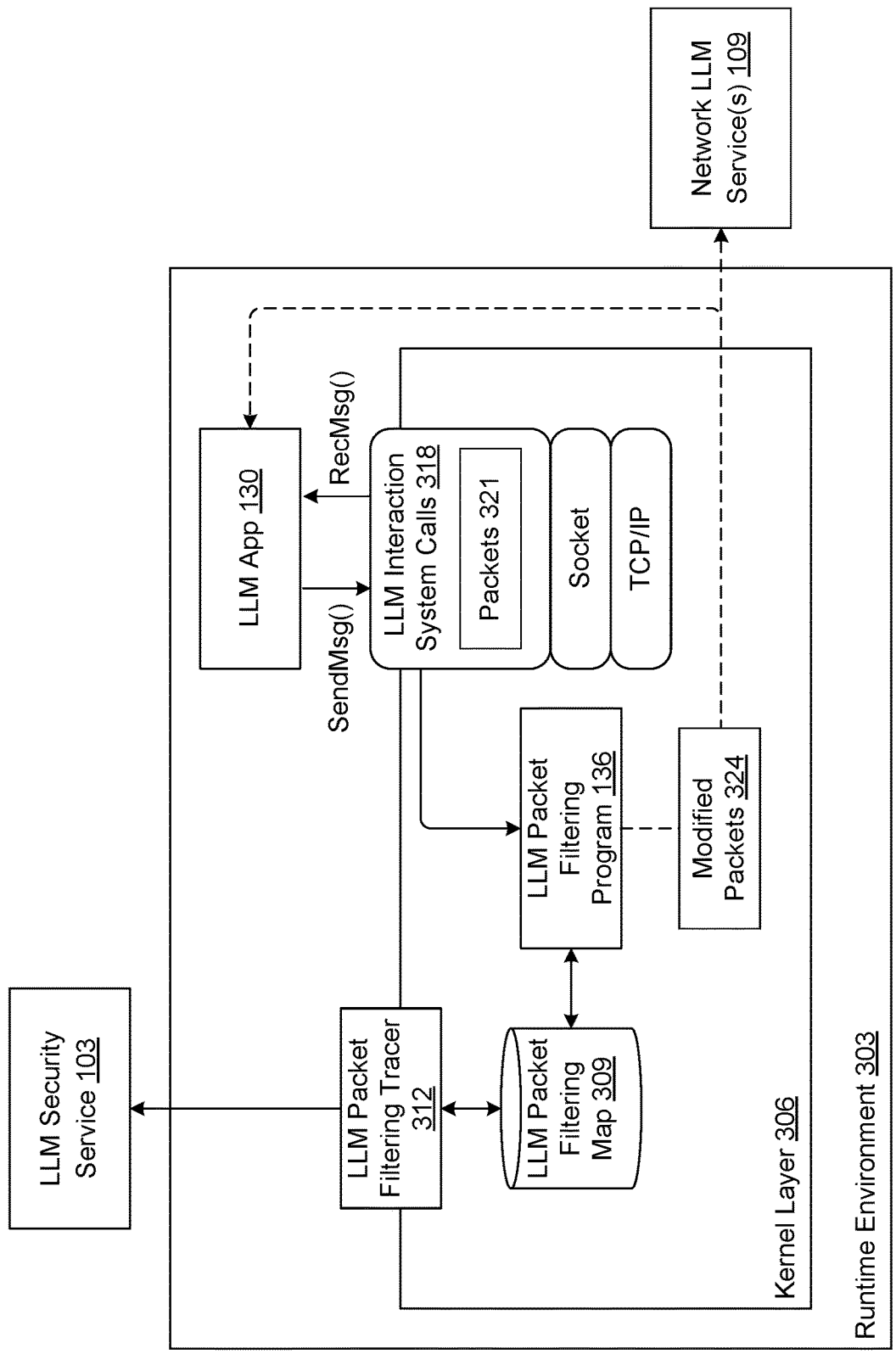
FIG. 3 provides another example of implementing LLM risk mitigation using the components of the networked environment of FIG. 1 according to various embodiments of the present disclosure.

FIG. 3 illustrates another example of the components of the networked environment 100 of FIG. 1 implementing LLM risk mitigation. Generally, this figure shows an example of how the LLM security service 103 can deploy an LLM packet filtering program 136 in a runtime environment 303 of an LLM application 130 to implement LLM risk mitigation. This can be performed in addition to or alternatively to code modifications to the LLM application 130.

Deployment can refer to provisioning a computing environment and executing software for which the computing environment is provisioned. In the present context, deployment can include provisioning the runtime environment 303 and executing the LLM packet filtering program 136 and the LLM application 130. Provisioning can refer to setting up and configuring hardware and software resources of the runtime environment 303 for successful operation of the LLM packet filtering program 136 and the LLM application 130. This can include installing or instantiating the LLM packet filtering program 136 and the LLM application 130. Deployment can include all processes involved to successfully provision and execute the LLM packet filtering program 136 and the LLM application 130 for operation in the runtime environment 303.

The runtime environment 303 can include a client device 106, a physical host device, a virtual machine, or another environment that executes the LLM application 130. The runtime environment 303 can provide compute and other hardware resources to execute the LLM application 130. The runtime environment 303 can also include firmware and software that facilitates execution of the LLM application 130 and the LLM packet filtering program 136, among other executable components. This can include a kernel layer 306.

The kernel layer 306 can refer to kernel space and associated executables including the kernel or core component of an operating system such as a Linux® operating system. The kernel layer 306 can manage system resources and act as an intermediary between software and hardware. One of the functions of the kernel layer 306 is to handle system calls, which can include predefined functions that enable applications such as the LLM application 130 to request services from the kernel, such as file interaction operations, memory allocation, and communications interactions. The kernel layer 306 can provide a number of communications interfaces of various types, including TCP/IP interfaces, socket interfaces, and others.

In this example, the kernel layer 306 includes an LLM packet filtering program 136, an LLM packet filtering map 309, and an LLM packet filtering tracer 312. In various examples, the LLM packet filtering tracer 312 can be part of the kernel-layer LLM packet filtering program 136, or can be a separate components. In some examples, the LLM packet filtering tracer 312 can be executed in user space. The LLM packet filtering tracer 312 can have access to the LLM packet filtering map 309. The kernel-layer LLM packet filtering program 136 can provide data to the LLM packet filtering tracer 312 based at least in part on the LLM packet filtering map 309. In instances where the LLM packet filtering tracer 312 is executed in user space or a user layer, the LLM packet filtering map 309 can be a kernel-layer memory expose to the LLM packet filtering tracer 312 using at least one of a driver, a system call, a memory mapped file, a kernel module, an application programming interface, or any combination thereof.

The LLM packet filtering program 136 can identify and intercept LLM interaction system calls 318. The LLM packet filtering program 136 can identify and intercept communications received from network LLM services 109 that are destined for the LLM applications 130. The LLM packet filtering program 136 can trap the packets 321 that are part of an LLM interaction system call 318, modify the packets 321, and forward the modified packets 324 to the original destination, which can include the network LLM services 109 or the LLM application 130.

The LLM packet filtering program 136 can include or be associated with trigger code that identifies events or conditions specified by a hook event that triggers further execution of the LLM packet filtering program 136. Packets 321 that conform to LLM interaction fingerprints 145 can trigger execution of the LLM packet filtering program 136, while other packets 321 on the same communications interface are passed unmodified and without triggering the LLM packet filtering program 136.

The LLM packet filtering program 136 can perform risk mitigation actions using various operations including at least one of packet filtering, network address translation, monitoring, tracing, or any combination thereof. Some examples of the LLM packet filtering program 136 can perform risk mitigation actions using LLM risk mitigation code 133 that includes an inline LLM that takes the packet as input and outputs a modified packet 324 and/or instructions to drop the packet 321, store it, perform a forwarding action to perform risk mitigation. Other examples can include rules-based operation to perform these functions. The modified packet 324 can include a modified message, parameter set, and other modified LLM input content. The modified packet 324 can also include a modified destination address.

LLM packet filtering program 136 can store tracing data in the LLM packet filtering map 309 or otherwise provide it to the LLM packet filtering tracer 312. Tracing data can include original packets 321 and modified packets 324, as well as timestamped metadata that can include the LLM interaction system calls 318, a unique identifier of the LLM application 130, a unique identifier for the runtime environment 303, operating system and version, and other types of hardware and software metadata that describes the runtime environment 303. The LLM packet filtering tracer 312 can provide the tracing data to the LLM security service 103 or another LLM communication data storage and analysis service.

Figure 4:
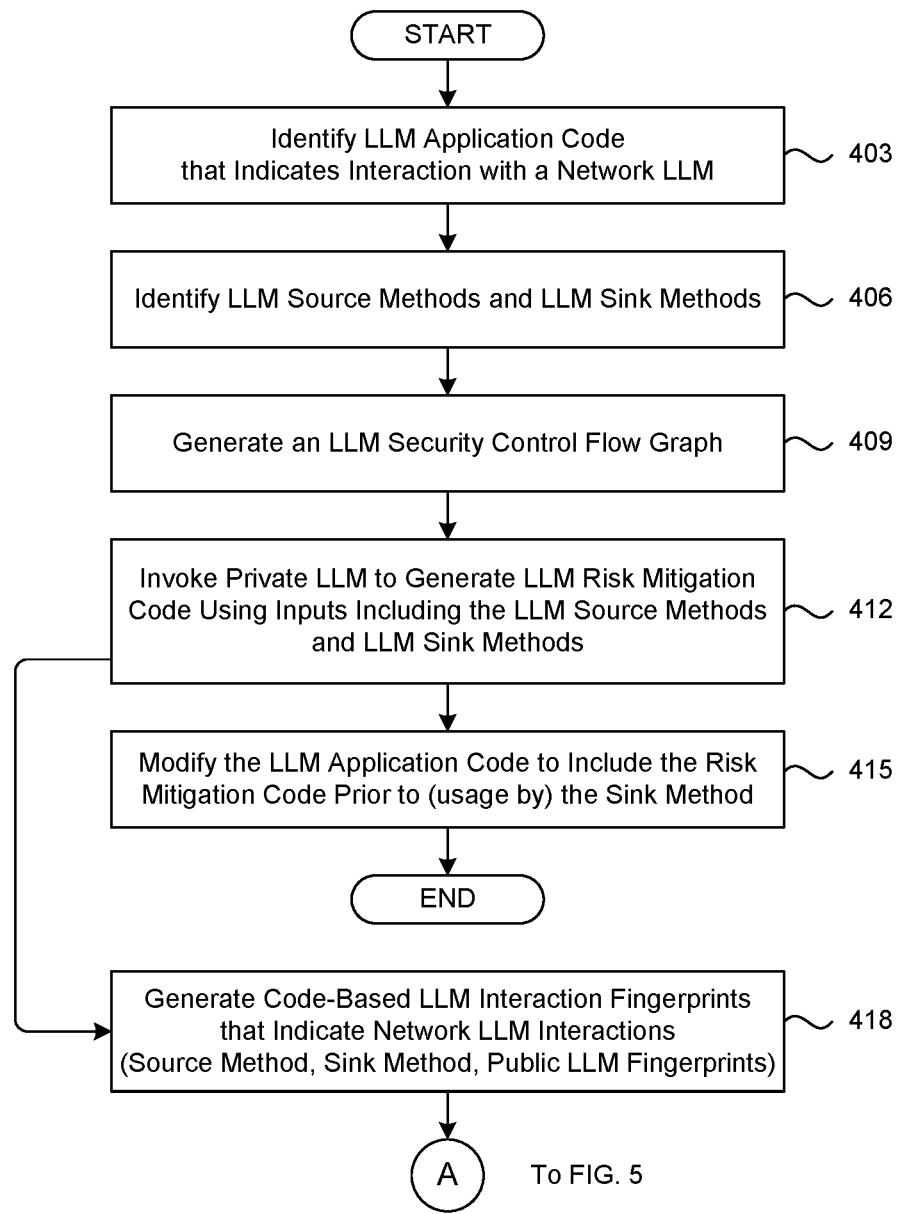
FIG. 4 is a flowchart illustrating functionality of components of the networked environment of FIG. 1 according to various embodiments of the present disclosure.

FIG. 4 shows a flowchart providing an example of LLM risk mitigation implemented using the LLM security service 103 and other components of the networked environment 100. The flowchart of FIG. 4 provides merely an example of the many different types of functional arrangements that can be employed to implement the depicted interactions between the components of the networked environment 100. As an alternative, the flowchart of FIG. 4 can be viewed as depicting an example of elements of a method implemented within the networked environment 100. While blocks are generally described as performed using the LLM security service 103, this can include instructions executed by various components of the networked environment 100.

In block 403, the LLM security service 103 can identify LLM application code that indicates interaction with a network LLM service 109. In other words, the LLM security service 103 can determine whether a particular application is an LLM application 130. The LLM security service 103 can use the LLM flow identification rules 142 to identify code in the application that includes any LLM interactions by performing a similarity comparison according to predetermined rules. The LLM security service 103 can process the application using the LLM vector store 139 according to the LLM flow identification rules 142 to identify whether the application includes any LLM interactions. If the application includes LLM interactions with network LLM service 109 then it can be identified and tagged as an LLM application 130. In some examples, the LLM flow identification rules 142 enable the LLM security service 103 to extract an LLM interaction portion of the LLM application 130.

In block 406, the LLM security service 103 identify LLM source methods and LLM sink methods of the LLM application 130. The LLM security service 103 can perform a customized static analysis, for example, using a plugin in a static code analyzer to perform this functionality. The static analysis can use the LLM flow identification rules 142 to identify code in the application that includes any LLM source methods by checking for matches or similarity according to predetermined rules. The LLM flow identification rules 142 can reference an LLM vector store 139 that provides examples of LLM source methods or otherwise identifies LLM source methods. The LLM security service 103 can process the LLM application 130 using the source methods LLM vector store 139 according to the LLM flow identification rules 142 to identify the LLM source methods.

The LLM security service 103 can also use the LLM flow identification rules 142 to identify code in the application that includes any LLM sink methods by checking for matches or similarity according to predetermined rules. The LLM flow identification rules 142 can reference an LLM vector store 139 that provides examples of LLM sink methods or otherwise identifies LLM sink methods. The LLM security service 103 can process the LLM application 130 using the sink methods LLM vector store 139 according to the LLM flow identification rules 142 to identify the LLM sink methods.

The LLM security service 103 can also identify one or more nodes or functions of the LLM interaction flow that are between the LLM source method and the LLM sink method. This can include LLM-specific and LLM-agnostic data validation, sanitization, transformation, storage, processing, analysis, authorization, authentication, data transfer (e.g., to the LLM), and other types of nodes. LLM-specific nodes can include nodes for sensitive data elements, harmful content, prompt injection security, bias mitigation, hallucination mitigation, and other types of data validation and sanitation. This can also include checks for valid addressing of transmissions and other types of LLM-agnostic nodes of the LLM interaction flow.

In block 409, the LLM security service 103 can create the LLM security control flow graph 206 based at least in part on the original LLM interaction flow. The LLM security service 103 can process the original LLM interaction portion of the LLM application 130 to generate the LLM security control flow graph 206. Additional or modified nodes can be added corresponding to LLM-specific functions.

In block 412, the LLM security service 103 can invoke the risk mitigation LLM 115 to generate LLM risk mitigation code 133. The LLM security service 103 can provide the original LLM interaction portion of the LLM application 130 as input to the risk mitigation LLM 115. Examples that utilize the LLM interaction portion can increase efficiency, reduce storage, and energy use relative to services that provide an entire LLM application 130 as input.

The LLM risk mitigation code 133 can include code that tests and mitigates various risks associated with interactions with network LLM services 109 as discussed. The LLM risk mitigation code 133 can include or remotely access LLM risk vector stores 139 to identify whether communication packets generated or received by an LLM application 130 are associated with specified risks. To this end, the LLM risk mitigation code 133 can include harmful content mitigation code, bias mitigation code, SDE leakage prevention code, LLM hallucination mitigation code, LLM threat model code, prompt injection security code, and others.

The various types of LLM risk mitigation code 133 can modify message content and other data from the LLM interaction flow such as information from the LLM source method, as well as information received from the LLM service 109. This can include information in packets communicated between the LLM application 130 and the LLM service 109. The LLM risk mitigation code 133 can include modifications to code of the LLM applications 130 so that the LLM application 130 can generate acceptably risk free message content and modify received message content from network LLM services 109. In some examples, the LLM source method and the LLM sink method can also be updated or modified based at least in part on LLM risk mitigation code 133.

The LLM security service 103 or the risk mitigation LLM 115 can also test the LLM risk mitigation code 133 in a recursive or feedback-based system that tests the resulting LLM risk mitigation code 133 and the overall flow until the output reaches predetermined thresholds for each type of LLM risk mitigation code 133. This can include checking the LLM-generated code against a set of one or more LLM risk vector stores 139. The LLM risk vector stores 139 can include vector stores for each of the types of LLM risks corresponding to types of LLM risk mitigation code 133 that the risk mitigation LLM 115 generates. If this vector store test fails, then the LLM security service 103 or the risk mitigation LLM 115 can recursively provide the LLM risk mitigation code 133 and/or the resulting overall set of code corresponding to the LLM security control flow graph 206 back to the risk mitigation LLM 115. This process can continue recursively until the LLM risk mitigation code 133 and/or the resulting overall set of code is free from risks according to the test against the LLM risk vector stores 139. In some examples, the process includes mechanisms that provide risk mitigation through modification of the LLM application 130. Application modification is described in block 415. In further examples, the process additionally or alternatively includes mechanisms that provide risk mitigation through packet filtering. In such examples, block 418 can be executed additionally or alternatively to the application modification process of block 415.

In block 415, the LLM security service 103 can modify the LLM application 130 by adding functions corresponding to risk mitigation code 133. The LLM security service 103 can additionally update existing portions of the LLM application 130. These modifications can be performed by replacing the code of the original LLM interaction flow with that of the LLM security control flow graph 206. Thereafter, the process of generating the modified LLM application 130 can end. The modified LLM application 130 can be stored and deployed with confidence that it includes effective LLM risk mitigation code 133.

In block 418, the LLM security service 103 and the risk mitigation LLM 115 can also generate LLM interaction fingerprints 145 that enable an LLM packet filtering program 136 to intercept, modify, and otherwise affect packets. The LLM security service 103 can also generate risk mitigation code 133 that can be executed or triggered using the LLM packet filtering program 136 once LLM interaction packets are intercepted according to the LLM interaction fingerprints 145. The process can then move to FIG. 5.

Figure 5:
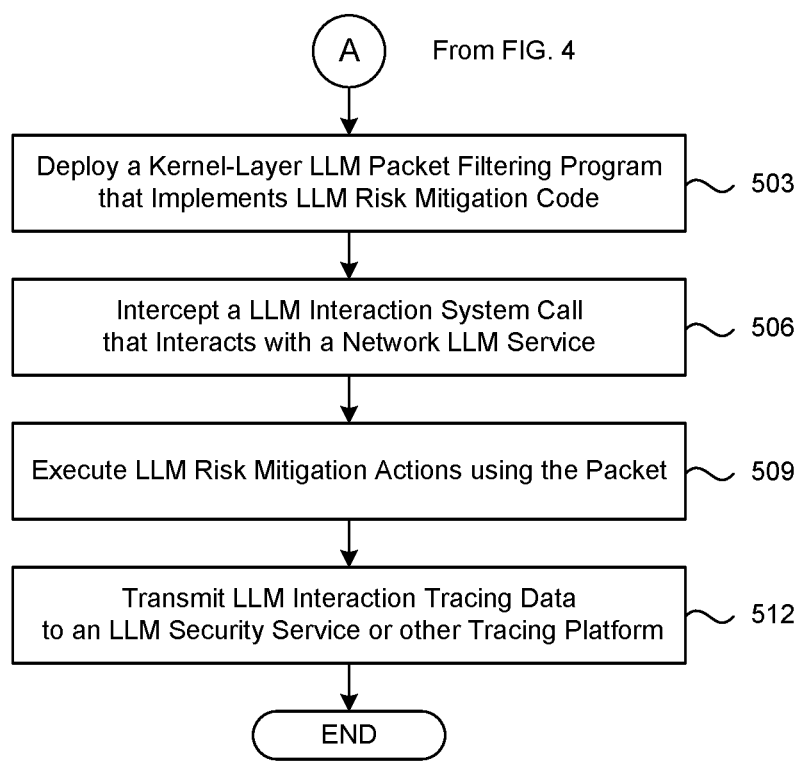
FIG. 5 is a flowchart illustrating functionality of components of the networked environment of FIG. 1 and continuing the flowchart of FIG. 4 according to various embodiments of the present disclosure.

FIG. 5 shows a flowchart that expands on the flowchart of FIG. 4, providing an example of LLM risk mitigation implemented using the LLM security service 103 and other components of the networked environment 100. The flowchart of FIG. 5 provides merely an example of the many different types of functional arrangements that can be employed to implement the depicted interactions between the components of the networked environment 100. As an alternative, the flowchart of FIG. 5 can be viewed as depicting an example of elements of a method implemented within the networked environment 100. While blocks are generally described as performed using the LLM security service 103, this can include instructions executed by various components of the networked environment 100.

In block 503, the LLM security service 103 can deploy a kernel-layer program such as an LLM packet filtering program 136 that implements risk mitigation code 133. In some examples, the LLM packet filtering program 136 executes risk mitigation code 133, and in other examples, the LLM packet filtering program 136 can intercept system calls and provide packets and other data to the risk mitigation code 133. The LLM security service 103 can deploy LLM packet filtering program 136 in a runtime environment 303 that executes an LLM application 130. The runtime environment 303 can also include firmware and software that facilitates execution of the LLM application 130 and the LLM packet filtering program 136 in a kernel layer 306.

In block 506, the LLM packet filtering program 136 can identify and intercept LLM interaction system calls 318. The LLM packet filtering program 136 can identify and intercept communications received from network LLM services 109 that are destined for the LLM applications 130. The LLM packet filtering program 136 can trap the packets 321 that are part of a system call 318, modify the packets 321, and forward the modified packets 324 to the original destination, which can include the network LLM services 109 or the LLM application 130.

The LLM packet filtering program 136 can include or be associated with trigger code that identifies events or conditions specified by a hook event that triggers further execution of the LLM packet filtering program 136. Packets that conform to LLM interaction fingerprints 145 can trigger execution of the LLM packet filtering program 136, while other packets on the same communications interface are passed unmodified and without triggering the LLM packet filtering program 136.

In block 509, the LLM packet filtering program 136 can perform risk mitigation actions using a packet 321 of the LLM interaction system call 318. The LLM packet filtering program 136 can perform operations including packet filtering, network address translation, monitoring, and tracing. Some examples of the LLM packet filtering program 136 can perform risk mitigation actions using LLM risk mitigation code 133 as discussed. In some examples, the LLM risk mitigation code 133 can include an inline LLM that is trained using packets that include each of the various types of risks discussed and packets that are verified as corrected for each of the types of risk. The LLM packet filtering program 136 can use the inline LLM to perform a packet modification that corrects one of the types of risks discussed for various types of LLM risk mitigation code 133. This can generate a modified packet 324 that includes a modified message, parameter set, and other modified LLM input content. The modified packet 324 can also include a modified destination address.

In block 512, the LLM packet filtering program 136 can transmit LLM interaction tracing data to the LLM security service 103 or a tracing platform. This can include providing the tracing data to the LLM packet filtering tracer 312 or transmitting it directly to the LLM security service 103. Tracing data can include the original packets 321 and modified packets 324, as well as timestamped metadata that can include the LLM interaction system calls 318, a unique identifier of the LLM application 130, a unique identifier for the runtime environment 303, operating system and version, and other types of hardware and software metadata that describes the runtime environment 303.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages could be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or any combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

The invention claimed is:

1. A system, comprising:
at least one computing device comprising at least one processor and at least one memory; and
machine-readable instructions stored in the at least one memory that, when executed by the at least one processor, cause the at least one computing device to at least:
identify a large language model (LLM) application that interacts with a network LLM service;
extract an LLM interaction portion of the LLM application corresponding to code, the code comprising an LLM source method and an LLM sink method;
provide the LLM interaction portion of the LLM application as input to an LLM risk mitigation code generation function that outputs LLM-specific risk mitigation code that mitigates at least one LLM-specific risk in the LLM interaction portion; and
deploy a modified version of the LLM application that is modified to include the LLM-specific risk mitigation code generated by the risk mitigation code generation function.

2. The system of claim 1, wherein the LLM risk mitigation code generation function is a risk mitigation LLM that is trained to correct the at least one LLM-specific risk by generating the LLM-specific risk mitigation code.

3. The system of claim 2, wherein the risk mitigation code generation function iteratively updates the LLM-specific risk mitigation code until updated LLM-specific risk mitigation code passes at least one threshold identified by an LLM risk test performed using at least one vector store that identifies a corresponding at least one LLM-specific risk type.

4. The system of claim 3, wherein the at least one LLM-specific risk type comprises at least one of: secure data element mitigation, harmful content mitigation, prompt injection security, bias mitigation, hallucination mitigation, or any combination thereof.

5. The system of claim 1, wherein the LLM source method is a source method that identifies or generates data provided as an input to the network LLM service.

6. The system of claim 1, wherein the LLM sink method is a sink method that uses data received from the network LLM service.

7. The system of claim 1, wherein the modified version of the LLM application that is modified to include the LLM-specific risk mitigation code between the LLM source method and the LLM sink method.

8. A method, comprising:
deploying a large language model (LLM) application along with an LLM risk mitigation program, wherein the LLM application interacts with a network LLM service;

executing the LLM risk mitigation program based at least in part on intercepting a system call that corresponds to an LLM interaction fingerprint, wherein the LLM interaction fingerprint identifies the system call as being generated for a communication between the LLM application and the network LLM service; and modifying, based at least in part on execution of the LLM risk mitigation program, the system call using at least one risk mitigation function, wherein modifying the system call comprises at least one of: modifying a packet of the system call, dropping the packet, forwarding the packet, or any combination thereof.

9. The method of claim 8, further comprising:
providing at least a portion of the LLM application as input to generate the LLM interaction fingerprint that identifies LLM interaction system calls for communications between the LLM application and the network LLM service.

10. The method of claim 8, wherein the LLM risk mitigation program is packet filtering program that performs packet inspection and modifies the system call in an instance in which the system call is identified to correspond to the LLM interaction fingerprint based at least in part on the packet inspection.

11. The method of claim 8, further comprising:
transmitting LLM interaction tracing data to a network service, the LLM interaction tracing data comprising at least one of: the packet of the system call, a modified packet, timestamped metadata associated with the system call, or any combination thereof.

12. The method of claim 8, wherein the at least one risk mitigation function comprises an in-line LLM implemented using the LLM risk mitigation program.

13. The method of claim 8, wherein the at least one risk mitigation function includes or accesses at least one vector store that identifies a corresponding at least one LLM-specific risk type.

14. The method of claim 8, wherein the system call comprises a command to transmit or receive communications.

15. A system, comprising:
at least one computing device comprising at least one processor and at least one memory; and
machine-readable instructions stored in the at least one memory that, when executed by the at least one processor, cause the at least one computing device to at least:

identify a large language model (LLM) application that interacts with a network LLM service;
provide at least a portion of the LLM application as input to an LLM risk mitigation code generation function that outputs LLM-specific risk mitigation code; and
deploy a runtime environment comprising at least one of: a modified version of the LLM application that is modified to include the LLM-specific risk mitigation code to mitigate at least one LLM-specific risk type, an LLM risk mitigation program that intercepts LLM interaction system calls and uses the LLM-specific risk mitigation code to mitigate the at least one LLM-specific risk type, or any combination thereof.

16. The system of claim 15, wherein the LLM risk mitigation program is a packet filtering program that invokes or executes the LLM-specific risk mitigation code in relation to a packet in an instance in which the packet corresponds to an LLM interaction fingerprint.

17. The system of claim 15, wherein the at least the portion of the LLM application is provided as the input to further generate an LLM interaction fingerprint that identifies LLM interaction system calls for communications between the LLM application and the network LLM service, and the LLM risk mitigation program uses the LLM interaction fingerprint to identify the LLM interaction system calls among a plurality of system calls to network communications interfaces.

18. The system of claim 15, wherein the machine-readable instructions, when executed by the at least one processor, cause the at least one computing device to at least:
modify, based at least in part on execution of the LLM risk mitigation program, the system call using at least one risk mitigation function, wherein modifying the system call comprises at least one of: modifying a packet of the system call, dropping the packet, forwarding the packet, or any combination thereof.

19. The system of claim 18, wherein the at least one risk mitigation function includes or accesses at least one vector store that identifies a corresponding at least one LLM-specific risk type.

20. The system of claim 15, wherein the at least one LLM-specific risk type comprises at least one of: secure data element mitigation, harmful content mitigation, prompt injection security, bias mitigation, hallucination mitigation, or any combination thereof.

* * * * *